United States Patent [19]

Jaumann

[11] Patent Number: 4,666,112
[45] Date of Patent: May 19, 1987

[54] TRIPOD FOR MOUNTING FILM AND VIDEO CAMERAS

[75] Inventor: Leonhard Jaumann, Munich, Fed. Rep. of Germany

[73] Assignee: Sachtler GmbH, Garching, Fed. Rep. of Germany

[21] Appl. No.: 753,186

[22] Filed: Jul. 9, 1985

[30] Foreign Application Priority Data

Jul. 10, 1984 [DE] Fed. Rep. of Germany ....... 3425383

[51] Int. Cl.⁴ ............................................ F16M 11/38
[52] U.S. Cl. .................................... 248/169; 248/171; 354/293
[58] Field of Search ............ 248/169, 168, 167, 163.1, 248/163.2, 170, 171, 173; 354/293

[56] References Cited

U.S. PATENT DOCUMENTS 2,282,285  5/1942  Olson .................................. 248/169
2,668,682  2/1954  Dalton ................................ 248/169
4,324,477  4/1982  Miyazaki ........................ 248/171 X

FOREIGN PATENT DOCUMENTS 1950820  1/1966  Fed. Rep. of Germany .

Primary Examiner—Ramon O. Ramirez
Attorney, Agent, or Firm—Hayes, Davis & Soloway

[57] ABSTRACT

A tripod (1) including three tripod legs (3) pivotably hinged on a carrier member (2) and of adjustable length. For fixing the length of the tripod legs (3) respective clamping devices (11) are provided. To adjust the height of the tripod, the clamping devices (11) on the tripod legs (3) can be actuated in common by means of a control handle (12). For this purpose three props (13) are hinged on the control handle (12), each one of said props being connected with one clamping device (11). In a lower stop position of the control handle (12), into which position the props (13) pass substantially horizontally, the length of all tripod legs (3) is fixed.

3 Claims, 5 Drawing Figures

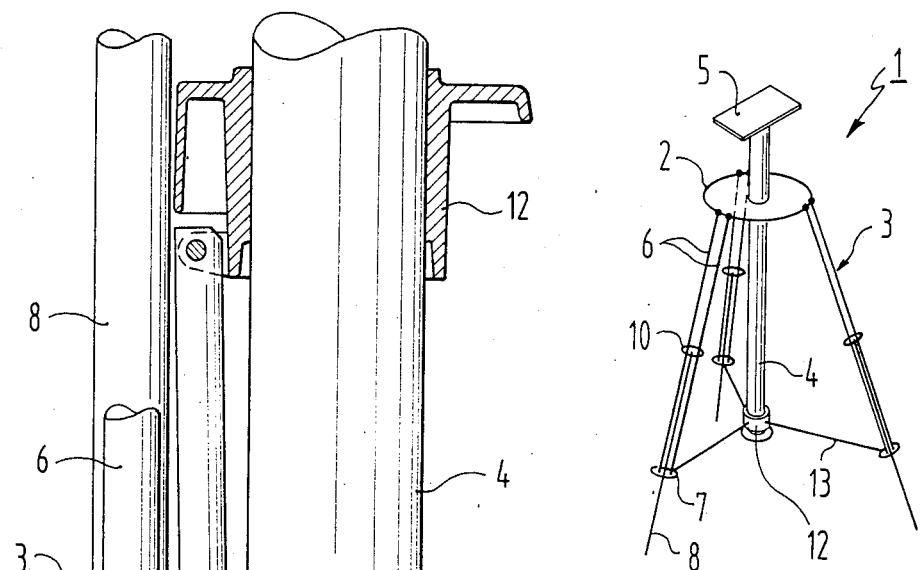
Fig. 1
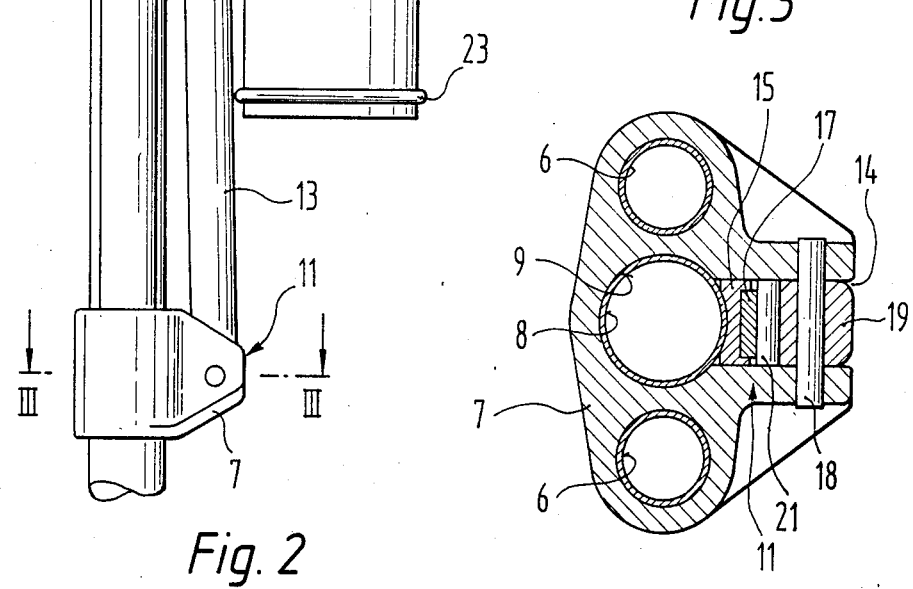
Fig. 2
Fig. 3

TRIPOD FOR MOUNTING FILM AND VIDEO CAMERAS

The invention relates to tripods for mounting film and video cameras.

Tripods of that kind for mounting film and television cameras or the like have three legs each one pivotally hinged on a carrier member and adjustable in length by means of adapters, which legs can be fixed at a desired length. The length of the tripod legs is usually fixed by means of separate clamping devices, which each have a pressure portion pressable against an adapter of a tripod leg by means of a pivotable eccentric toggle.

It is further known in tripods having a downwardly extending vertical central column between the tripod legs provided with a sliding sleeve on which three props are hinged. Said props being hinged at their other ends on guide blocks on the tripod legs in which the adapters of the tripod legs are guided. This structure serves to stabilize the tripod when the legs are spread, that is, in the operating position.

The invention is based on the problem of simplifying the use of the tripod, specially of simplifying the clamping of the adapters to the desired length.

According to the invention there is provided a tripod including three legs pivotally hinged on a carrier member for adjustment between a closed and an open position, said legs being of adjustable length each of which can be clamped at the desired length by a clamping device having a pressure pad (15) pressable against said leg by means of a pivotable eccentric, the improvement wherein each one of the three eccentrics (19) is pivoted via respective supports (13) of equal length from a common central control handle (12) situated between said tripod legs (3), wherein the length of the open tripod legs (3) can be fixed at a lower stop position of said control handle (12).

According to the invention all three eccentric toggles are hinged via respective props of equal length on a common control handle situated between the tripod legs. When the tripod legs are retracted the props extend upwardly substantially parallel with the tripod leg toward the control handle. When the tripod legs are unfolded from said position until reaching the operating position of the tripod, then the control handle arrives at a lower stop position in which the props pass substantially horizontally from the control handle to the individual tripod legs. In said stop position eccentric toggles provided at the end of each prop act upon the pressure portion within the clamping device and thus adjust the tripod legs to the desired length. If the length of the tripod legs is to be changed, then the control handle is slightly lifted so that the eccentric toggles now release the adapters of the tripod. In the new adjusted length the control handle is pressed downwardly into the stop position so that the eccentrics adjust the tripod legs to the new length.

Thus, only a single handle is needed for adjusting the tripod legs to the desired length, since all eccentric toggles are actuated in common by the control handle.

The control handle is preferably built as a sliding sleeve which slides on a vertical central column extending downwardly from the carrier member of the tripod and situated between the tripod legs. In its lower position, which is the stop position, the sliding sleeve strikes, for instance, against an end flange at the lower end of the central column. By lifting the sliding sleeve above the central column, the eccentrics no longer act upon the pressure portions in the individual clamping devices so that the adapters of the tripod are released. The tripod can now be adjusted to the new height and fixed in the stop position by a repeated downward shifting of the sliding sleeve.

The eccentric toggles preferably have for the clamping devices one or more eccentric which also fixes the length of the tripod legs when they are retracted.

It is specially advantageous if between the pressure portion in the clamping device and the eccentric toggle there is situated a leaf spring which is slightly bowed toward the eccentric in the area that interacts with said eccentric. By said bow the stop position of the sliding sleeve and also the clamping position are very well defined; on the other hand, the adapters of the tripod legs are already released when the control handle, for instance, the sliding sleeve, is only slightly moved from said stop position.

It can be seen that the described central clamping of all tripod legs can be used in tripods which do or do not have a central column.

The invention is explained in detail in an embodiment, given by way of example, with reference to the accompanying drawings, in which:

FIG. 1 is a diagrammatic perspective view of a tripod having a central column and a clamping device according to the invention;

FIG. 2 is an elevation in partial section of the central column and of a tripod leg with the clamping device according to the invention;

FIG. 3 is a section along III—III in FIG. 2;

Figure 4:
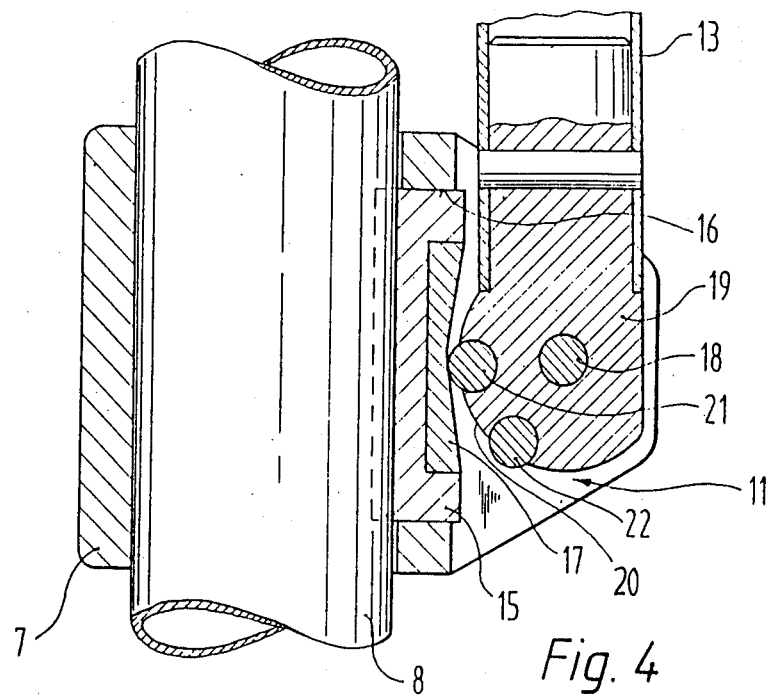
FIG. 4 is a longitudinal section through the clamping device.

Referring to FIG. 1, a tripod 1 has three legs 3 adjustable in length and pivotably hinged on a carrier member 2 and a vertical central column 4 vertically adjustably situated in the carrier member 2 and holding at its upper end a support device 5 for a camera. The vertical central column 4 projects downwardly through the carrier member 2, the downwardly projecting portion being stationary relative to said carrier member 2.

Each tripod leg 3 comprises two outer parallel props 6 pivotably hinged on the carrier member 2 and connected at their lower ends by a guide block 7, and a central lengthening prop 8 passed into a central hold 9 of the guide block 7. At its upper end facing the carrier member 2, the lengthening prop 8 is firmly connected to another guide block 10 which for its part slides on the outer prop 6.

In each guide block 7 is provided a clamping device 11 with which the respective lengthening prop 8 can be locked.

Above the central column is displaceably mounted a sliding sleeve 12 on which are pivotably hinged three props 13 each one of which leads to a guide block 7 with the clamping device 11 situated therein. Said clamping device 11 has a bore centered on the central hole 9 and in which is inserted a pressure block 15 which abuts the lengthening prop 8 over a portion of its periphery. In a recess 16 in the pressure portion 15 is inserted a pressure plate 17. The guide block defines an opening 14 in opposed lines of which is inserted a horizontal bolt 18 with which the respective outer end (19) of the connecting prop 13 is connected pivotable around this bolt 18. The prop 13 and bolt 18 are connected via an eccentric toggle (19) which in its region facing the pressure plate 17 has a cylindrical periphery 20. In this cylindrical periphery 20 there are inserted parallel with the generatrices thereof two metal pins 21 and 22 which project slightly over the cylindrical outline 20 and serve as eccentrics for the pressure plate 17. Both metal pins 21 and 22 are located on the periphery of the cylindrical periphery in a manner such that the metal pin 21 rests on the pressure plate 17 when the prop 13 and the respective tripod leg 3 are parallel with each other, that is, when the tripod is folded in, while the other metal pin 22 rests on the pressure plate 17 when the legs 3 have been fully spread out into the operating position shown in FIG. 1. In this operating position the sliding sleeve 12 rests above a locking collar 23 at the lower end of the central column 4. In this position there can also be provided for the sliding sleeve a stop, and thus this position is generally designated as the stop position.

If the tripod legs are spread out to the operating position as in FIG. 1, then the sliding sleeve 12 is in the stop position and the metal pin 22 presses upon the pressure plate so that the pressure portion 15 is compressed against the lengthening prop 8 and locks it by friction in the respective position. If the length of the tripod legs is to be changed, then the sliding sleeve 12 is slightly lifted from the stop position, the props 13 are then tilted about the bolts 18. During this tilting movement the metal pin 22 slides from the pressure plate 17 so that the latter is released and the lengthening props 8 can be moved out to the new working height. By pressing down the sliding sleeve 12 into the stop position, the metal pin 22 again runs on the pressure plate 17 whereby the pressure portion 15 is again compressed against the lengthening prop 8 and again fixes it. If the tripod is to be folded together, then the sliding sleeve 12 is lifted from the stop position and the lengthening props 8 are inserted, the tripod legs 3 being simultaneously retracted by the movement of the sliding sleeve 12. If the tripod legs and central column are parallel, then the other metal pin 21 runs on the pressure plate 17 whereby the lengthening props are again stopped. The tripod can now be transported or packed.

With the clamping device and the central sliding sleeve described, the clamping devices 11 are all accordingly actuated in common on the tripod legs 3. Besides, the stability of the tripod is increased by the props 13.

Figure 5:
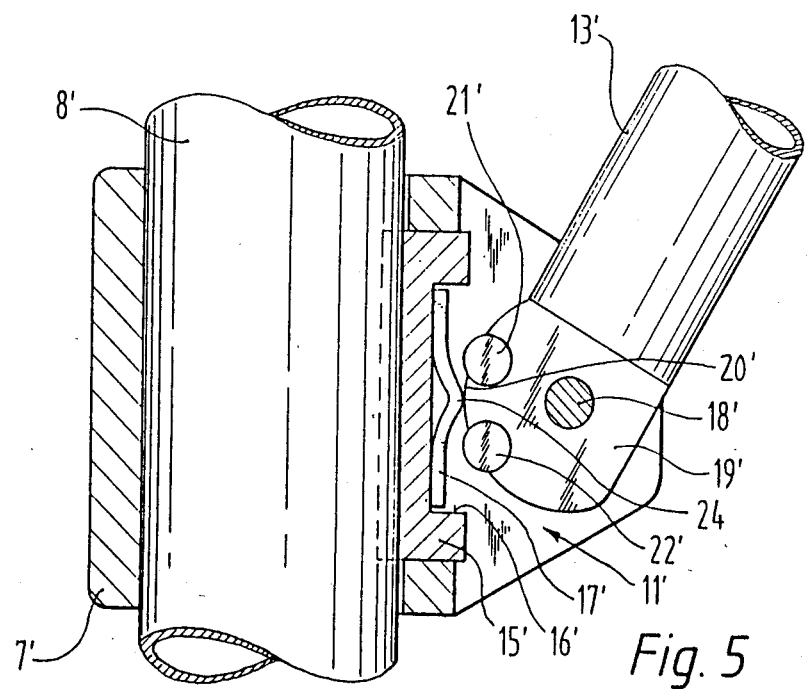
FIG. 5 is a partially sectioned elevation of a second embodiment of a clamping device according to the invention.

In FIG. 5 is illustrated a modified clamping device 11'. In comparison with the clamping device 11 described above, there has been substituted for the pressure plate 17 used there a relatively stiff leaf spring 17' which has in the central area a bow 24 oriented toward the cylindrical outer outline 20' of the eccentric toggle 19'. The bulge 23 serves to cause that the metal pins 21' and 22' come into contact and out of contact with the spring 17' within a relatively small angular area so that the arrest of the lengthening props 8' is very well defined. Besides, said leaf spring 17' serves for balancing construction tolerances due to its having a certain elasticity.

I claim:

1. In a tripod including three legs pivotally hinged on a carrier member for adjustment between a closed and an open position, said legs being of adjustable length each of which can be clamped at the desired length by a clamping device having a pressure pad (15) pressable against said leg by means of a pivotable eccentric, the improvement wherein each one of the three eccentrics (19) is pivoted via respective supports (13) of equal length from a common central control handle (12) situated between said tripod legs (3), wherein the length of the open tripod legs (3) can be fixed at a lower stop position of said control handle (12), wherein metal pins (21,22) inserted in a cylindrical outer contour (20) of said eccentric (19) provide an eccentric locking action.

2. In a tripod including three legs pivotally hinged on a carrier member for adjustment between a closed and an open position, said legs being of adjustable length each of which can be clamped at the desired length by a clamping device having a pressure pad (15) pressable against said leg by means of a pivotable eccentric, the improvement wherein each one of the three eccentrics (19) is pivoted via respective supports (13) of equal length from a common central control handle (12) situated between said tripod legs (3), wherein the length of the open tripod legs (3) can be fixed at a lower stop position of said control handle (12), and each one of said eccentrics (19) connected with said support (13) has one or more eccentrics (21) which permits adjustment of the length of said tripod legs (3) when they are retracted.

3. In a tripod including three legs pivotally hinged on a carrier member for adjustment between a closed and an open position, said legs being of adjustable length each of which can be clamped at the desired length by a clamping device having a pressure pad (15) pressable against said leg by means of a pivotable eccentric, the improvement wherein each one of the three eccentrics (19) is pivoted via respective supports (13) of equal length from a common central control handle (12) situated between said tripod legs (3), wherein the length of the open tripod legs (3) can be fixed at a lower stop position of said control handle (12), and between said pressure pad (15') and said eccentric (19') there is situated a leaf spring (17') which is bowed in a small area (24) toward said eccentric (19').

* * * * *